United States Patent [19]

Ackeret

[11] Patent Number: 4,493,417
[45] Date of Patent: Jan. 15, 1985

[54] STORAGE DEVICE FOR FLAT RECORDING MEDIA

[75] Inventor: Peter Ackeret, Kusnacht, Switzerland

[73] Assignee: IDN Inventions and Development of Novelties AG, Chur, Switzerland

[21] Appl. No.: 565,120

[22] Filed: Dec. 23, 1983

[30] Foreign Application Priority Data

Dec. 23, 1982 [DE] Fed. Rep. of Germany ....... 3247796

[51] Int. Cl.³ .............. B65D 85/672; A65D 6/06; A47B 88/04; A47B 97/00
[52] U.S. Cl. .............................. 206/387; 206/45.13; 206/311; 206/444; 206/804; 312/12; 312/319
[58] Field of Search ............... 206/311, 387, 379, 444, 206/45.13, 804; 312/10, 12, 319

[56] References Cited

U.S. PATENT DOCUMENTS

| Re. 30,184 | 1/1980 | Ackeret | 206/387 |
|---|---|---|---|
| 2,261,806 | 11/1941 | Hills | 312/10 |
| 2,269,637 | 1/1942 | Polkosnik | 206/379 |
| 2,278,529 | 4/1942 | Beder | 312/12 |
| 2,589,593 | 3/1952 | Anderson et al. | 206/45.13 |
| 2,720,438 | 10/1955 | Musick | 312/12 |
| 2,804,197 | 8/1957 | Popkess et al. | 206/45.13 |
| 3,561,004 | 2/1971 | Kozu et al. | 206/1 |
| 3,582,168 | 6/1971 | Bian | 312/19 |
| 3,677,396 | 7/1972 | Staar | 206/1 R |
| 3,811,745 | 5/1974 | Cylke | 312/13 |
| 3,836,222 | 9/1974 | Kuntze | 206/45.13 |
| 3,866,990 | 2/1975 | McRae | 312/15 |
| 3,893,585 | 7/1975 | Morrison et al. | 220/22.6 |
| 3,899,229 | 8/1975 | Ackeret | 312/319 |
| 3,904,259 | 9/1975 | Hoffmann et al. | 312/111 |
| 3,926,310 | 12/1975 | Ackeret | 206/387 |
| 3,994,550 | 11/1976 | Ackeret | 312/319 |
| 3,994,551 | 11/1976 | Ackeret | 312/319 |
| 3,995,737 | 12/1976 | Ackeret | 206/387 |
| 3,995,921 | 12/1976 | Ackeret | 312/12 |
| 4,046,255 | 9/1977 | Ackeret | 206/387 |
| 4,082,386 | 4/1978 | Beasley, Jr. | 206/804 |
| 4,113,091 | 9/1978 | Ackeret | 206/387 |
| 4,162,112 | 7/1979 | Konkler | 312/15 |
| 4,191,292 | 3/1980 | Schweizer | 206/387 |
| 4,275,943 | 6/1981 | Gelardi et al. | 206/387 |
| 4,293,266 | 10/1981 | St. Lawrence et al. | 206/387 |
| 4,387,802 | 6/1983 | Shearing et al. | 206/444 |
| 4,399,913 | 8/1983 | Gelardi et al. | 206/387 |
| 4,444,314 | 4/1984 | Jacobsson | 206/311 |

FOREIGN PATENT DOCUMENTS

| 344416 | 11/1977 | Austria . |
| 86275 | 8/1983 | European Pat. Off. . |
| 87765 | 9/1983 | European Pat. Off. . |
| 1141092 | 12/1962 | Fed. Rep. of Germany . |
| 1958291 | 4/1967 | Fed. Rep. of Germany . |
| 1797278 | 8/1971 | Fed. Rep. of Germany . |
| 7435482 | 5/1972 | Fed. Rep. of Germany . |
| 2149690 | 4/1973 | Fed. Rep. of Germany . |
| 2248408 | 1/1974 | Fed. Rep. of Germany . |
| 2307410 | 8/1974 | Fed. Rep. of Germany . |
| 2914415 | 6/1980 | Fed. Rep. of Germany . |
| 2917806 | 11/1980 | Fed. Rep. of Germany . |
| 3106511 | 9/1982 | Fed. Rep. of Germany . |
| 1343653 | 10/1963 | France . |
| 2127857 | 10/1972 | France . |

OTHER PUBLICATIONS

Ackeret U.S. Patent Application Serial No. 456,392, filed Jan. 7, 1983.

Primary Examiner—William T. Dixson, Jr.
Attorney, Agent, or Firm—Kenneth B. Herman

[57] ABSTRACT

A storage device for flat recording media, e.g., compact discs, is disclosed. The device comprises a housing and a slider member having a base portion and front wall that covers the open front face of the housing when the slider member is inserted. A lifting element, which is transported out of the housing by means of the slider member, is provided for supporting the recording media in a position for easy insertion and removal.

18 Claims, 16 Drawing Figures

STORAGE DEVICE FOR FLAT RECORDING MEDIA

BACKGROUND OF THE INVENTION

The invention relates to a storage device for recording media that have a flat form, such as magnetic tape cassettes and compact discs.

A typical device for storing such recording media is shown in U.S. Pat. No. 3,836,222. The '222 device comprises a grid-like framework relative to which slider members can be moved. Each slider member consists of a block that is guided on the framework and is screwed to a plate. On the plate in the area inside the framework is mounted a part of a locking mechanism, in front of which a box-like component, having a front wall, is fastened on the plate. On this box-like component there is hinged a pocket having an extension piece which projects into a free space provided in the framework and, when the slider member is ejected, runs up a crosspiece of the framework and as a result pivots the pocket.

One problem with the '222 device is that it requires a great deal of space in relation to the size of the recording media to be stored and, because of its complicated construction, can be manufactured only at considerable expense.

A problem with other existing devices, such as that described in German Patent Document No. PS 22 48 408, is that such devices require a certain amount of dexterity when being used. This is a significant disadvantage when the device is to be used by the driver of a motor vehicle.

SUMMARY OF THE INVENTION

The present invention solves these problems and provides other benefits. The present invention is suitable for use by a driver while driving a motor vehicle without distracting the driver's attention. At the same time, the device of the present invention requires a minimum amount of space and can be manufactured economically from a small number of components.

Broadly, the container of this invention may be defined as follows:

A storage device for flat recording media comprising:
(a) a housing having a bottom wall, a top wall, two elongate side walls, a rear wall, and an open front side;
(b) a slider member for receiving at least one recording medium, the slider member being movably mounted in the housing and having a base portion and a front wall;
(c) means for biasing the slider member to an open position out of the housing;
(d) means for locking the slider member to a closed position within the housing against the bias of the biasing means; and
(e) lifting means for supporting and engaging underneath the recording medium, said lifting means when the device is in the open position raising the recording medium to a lifted position away from the base portion of the slider member and above the front wall of the slider member so that the recording medium is accessible for removal and insertion.

BRIEF DESCRIPTION OF THE DRAWINGS

To facilitate further discussion of the invention, the following drawings are provided, in which.

DETAILED DESCRIPTION OF THE INVENTION

Figure 1:
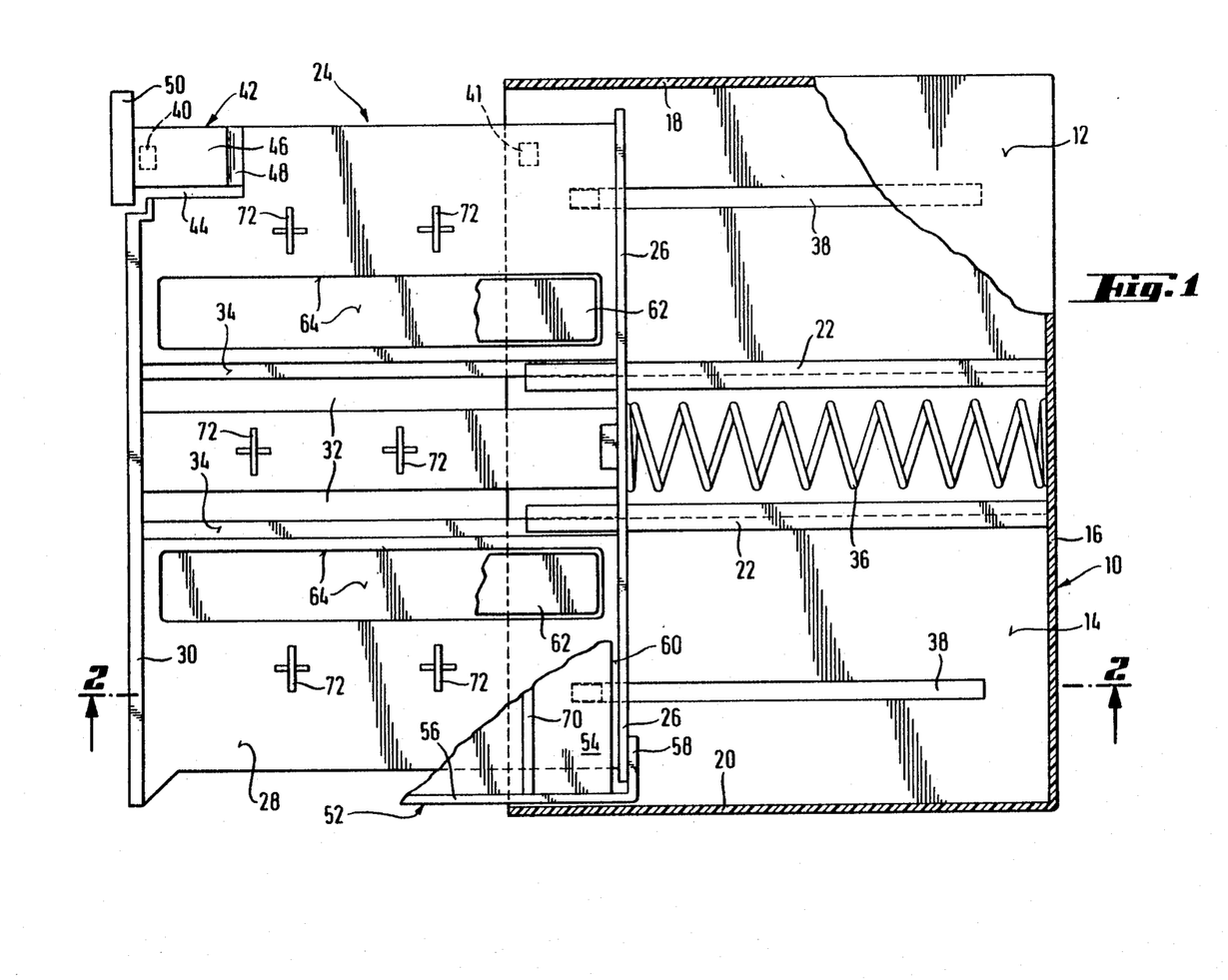
FIG. 1 shows a plan view, partly broken-away, of a first embodiment, intended for accommodating three magnetic tape cassettes.
Figure 2:
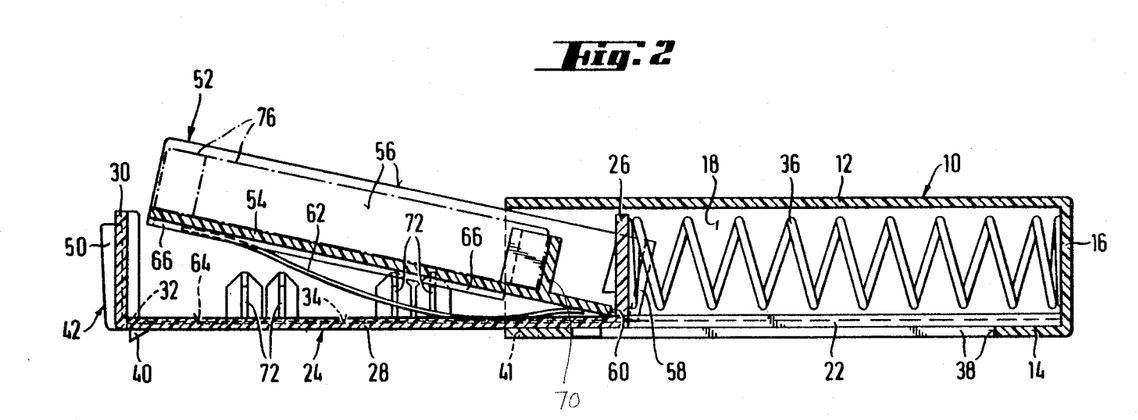
FIG. 2 is a view taken along line 2—2 of FIG. 1.
Figure 3:
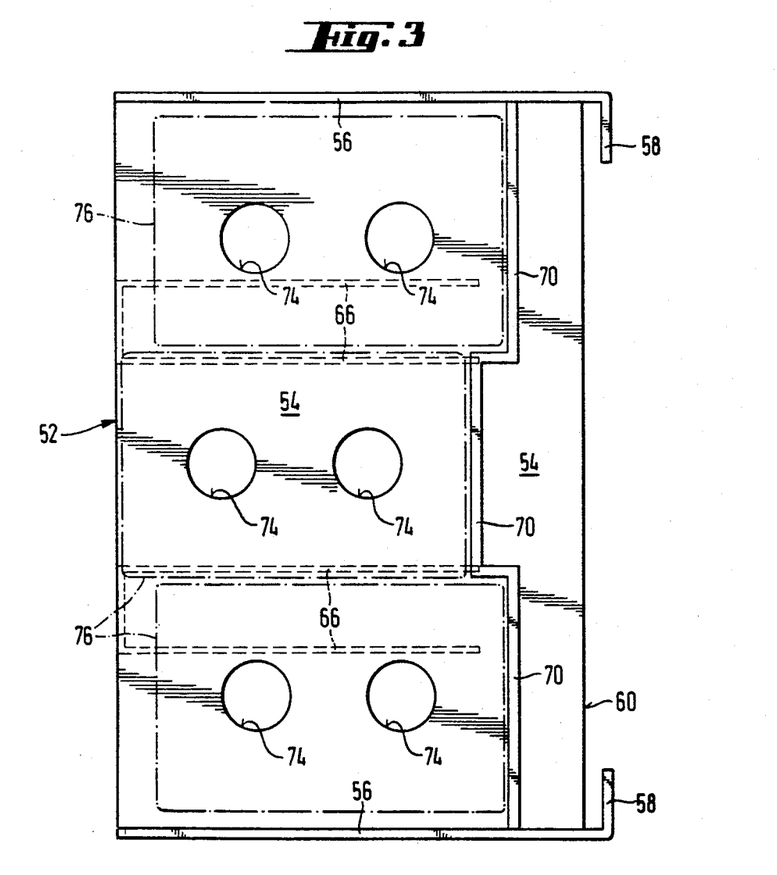
FIG. 3 Is a plan view of the lifting element of this embodiment.

The device according to FIGS. 1 to 3 comprises an outer housing 10 having a substantially slab-like basic form. The housing has a top wall 12, a base wall 14, a rear wall 16, and side walls 18 and 20. The side of the housing opposite the rear wall forms an open front face. Rails 22 extend along the base wall, parallel to the side walls, from the rear wall 16 to the open face of the housing. The rails 22 define a guide path for the sliding movement of a slider member 24, which comprises a rear plate 26, a base plate 28, and a front plate 30. Two parallel slots 32 extend from the rear plate 26 to the front plate 30 and divide the base plate into three separate platter elements.

The inner edges of the outer platter elements are stepped, as shown at 34, and the rails 22 engage over the steps and thus retain the slider member. A helical pressure spring 36 clamped between the rear wall 16 of the housing and the rear plate 26 of the slider member biases the slider member in the discharge direction, that is, the position shown in FIGS. 1 and 2. Stops are formed integrally with the base plate 28 of the slider member at the housing end, which stops slide in slots 38 in the base wall 14 of the housing and limit the outward travel.

In its storage position, that is, when it is inside the housing, the slider member is held against the bias of the spring 36 by means of locking means. For this purpose, a detent 40 on the underside of a key 42 is formed integrally with the base plate of the slider member. The key 42 is defined by a slot 44, which extends through the front plate 30 into the relevant platter element of the base. The portion 46 acts as a leaf spring that is connected with the rest of the base plate 28 by connection portion 48. This leaf spring also carries the actuating button 50, which lies approximately in the plane of the front plate 30. By means of this button the user can lift the detent 40 out of a complementary recess 41 in the base wall of the housing, whereupon the slider member is pushed out by the pressure spring 36.

The actuating button 50, together with the front plate 30 of the slider member, substantially close the open face of the housing when the slider member is pushed in and locked.

The rear plate 26 of the slider member does not extend across the whole width of the housing and a free space is left on each side. Before the slider member is mounted in the housing, a frame piece 52 is attached to it. Its construction can be seen in FIG. 3. The frame piece 52 comprises a cassette lifting element 54 having upwardly project lateral rims 56, the outer faces of which are at a distance from one another that is slightly smaller than the internal width of the housing between its side walls 18 and 20. From the ends of these rims inside the housing there extend inwardly toward one another hook portions 58 which are at a predetermined distance from the transverse end edge 60 of the lifting element. The gap so defined allows the frame piece 52 to be placed over the ends of the rear plate 26 of the slider member in such a manner that the lifting element can be moved to the removal position in which the lifting element 54 is pivoted upwards and outwards as in FIG. 2. In that position the rims 56 rest against the front edge of the top wall 12 of the housing. In the storage position, the lifting element 54 is substantially parallel to the base plate 28 of the slider member.

Resilient elements bias the lifting element 54 towards the pivoted-out position. Two metallic leaf springs 62 are positioned in complementary recesses 64 in the base plate 28 of the slider member and press against the underside of the lifting element 54. Lifting element 54 has projecting ribs 66 to prevent the leaf springs 62 from becoming displaced Leaf springs 62 typically are made from metal. It is, of course, also possible for the leaf springs 62 to be made of plastic material and integrally molded with the other components of the device. However, because the springs are permanently deflected when the device is closed it would be necessary to use a plastic material having no tendency for cold flow. That would cost more than the use of metal springs. The foregoing is true for the ejection springs 36.

On the upper side of the lifting element there are constructed upwardly projecting stops 70, against which the cassettes, such as three cassettes 76, can be supported. In order that the tape winding hubs of the cassettes 76 are secured against turning when in the storage position, the base plate 28 of the slider member has upwardly projecting retaining lugs 72. The lugs extend through holes 74 aligned with them in the lifting element 54 and into the winding hubs when the lifting element is depressed. When the slider member is in the outward position, the cassettes are lifted with their outer ends above the level of the free edge of the front plate 30. At the same time the winding hubs come free of the retaining lugs so that the cassettes can be removed from the front.

Little dexterity is required to replace the cassettes, as they can simply be placed onto the lifting element. Then the front plate 30 of the slider member is pushed into the outer housing. This causes the rims 56 to be pressed downwards by a wedge action against the front edge of the top wall 12 of the housing.

The device according to FIGS. 1-3 has been described very thoroughly, with regard to certain details, such as guides, stops, and ejection springs. Therefore, only the particular characteristic details of the other embodiments are described.

Figure 4:
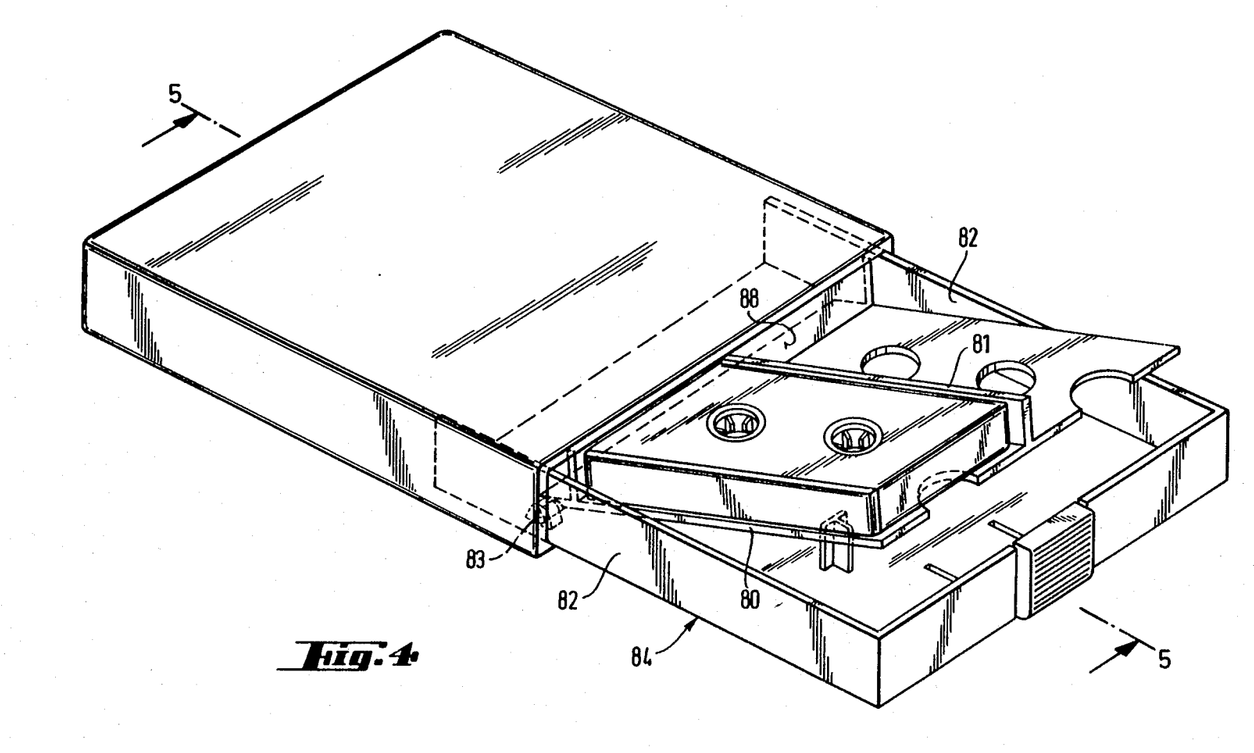
FIG. 4 is a perspective view of a second embodiment.

In the device of FIG. 4, unlike that of FIGS. 1 to 3, the slider member is constructed for the accommodation of two magnetic tape cassettes, for example, standardized video cassettes. The lifting element 80 is provided with a separating bar 81. The locking arrangement is located approximately in the center of the front plate of the slider member. In addition, the slider member is guided by means of its side plates 82 on the side walls of the housing rather than the rail arrangement on the base of the housing of the embodiment according to FIGS. 1-3.

Figure 5:
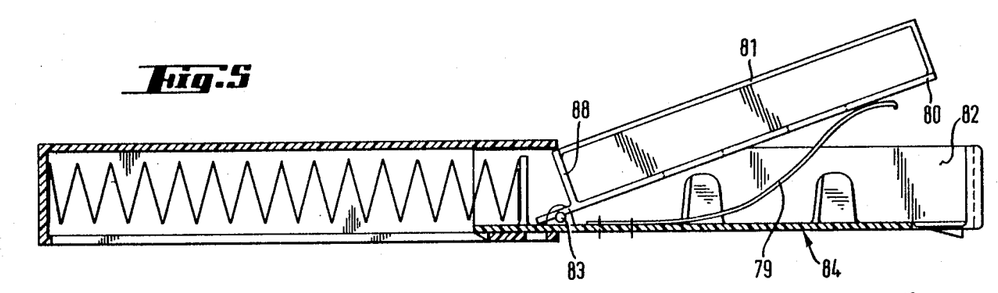
FIGS. 5 to 7 are sectional views of variants of the lifting element actuation means.
Figures 6, 7:
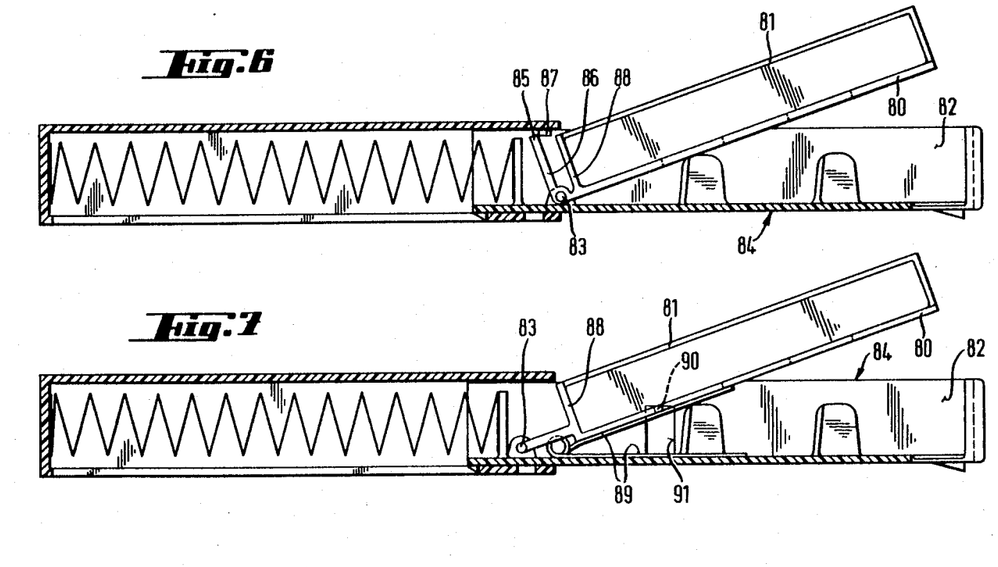

FIGS. 5 to 7 illustrate three ways of actuating the lifting element 80 to a position in which the cassettes can be easily inserted and removed. In FIG. 5, the lifting element is connected to the slider member 84 by means of a pivot joint 83 and a leaf spring 79. Leaf spring 79 is fastened at one end to the base of the slider member and presses with its other, free end against the lifting element, thereby pressing the free end of the lifting element upwardly. The cassettes rest against a stop 88.

In FIG. 6, a free edge 85 of an internal wall 86 of lifting element 80 contacts an inwardly projecting bar 87 on the housing. As a result, the lifting element is pivoted about its pivot bearing 83.

In FIG. 7, a biasing spring is provided for the lifting element in the form of a torsion coil spring 89 having two leg sections or wire ends. One leg is supported on the base of the slider member and the other leg is supported against the bottom of the lifting element 80. The lifting angle is limited by stop pins 90, which extend from the sides of the lifting element into openings 91 in the side plates 82 of the slider member. Stop pins 90 come to rest against the upper end edge of those openings.

Figures 8, 9:
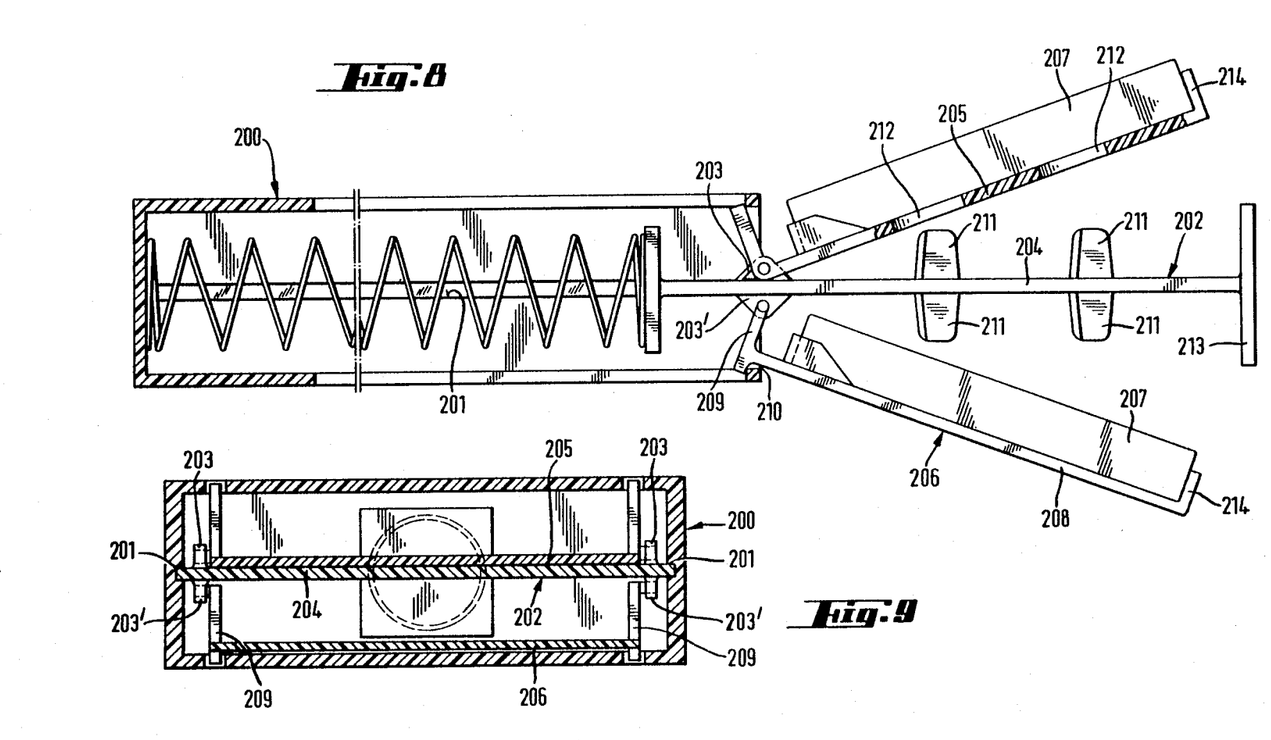
FIG. 8 shows a sectional view of a further embodiment.
FIG. 9 is a view of a section parallel to the front wall of the device according to FIG. 8.

FIGS. 8 and 9 show a variant of FIG. 6. In a double housing 200, a double slider member 202 is guided in grooves 201, which are located in the horizontal plane of symmetry of the housing. Extending from a central plate 204 of the slider member are pairs of lateral bearing blocks 203 and 203'. In the upper bearing blocks 203, a lifting element 205, analogous to the lifting element 80 in FIGS. 4 to 7, is mounted such that it can be pivoted through a limited angle. A suspension element 206 is pivotably mounted in the lower bearing blocks 203'. Suspension element 206 comprises a platter 208 designed to accommodate one or more cassettes 207 and a suspension plate 209. Suspension plate 209 extends upwardly at a right angle from platter 208 to a pivotal engagement with bearing block 203'.

The lifting element 205 is lowered by the force of gravity when the slider is pushed in. The suspension element 206 is lifted by wedge action when platter 208 hits the front edge 210 of the housing. At the same time, edge 210 limits the downward pivoting movement of suspension element 206. Retaining lugs 211 are formed, in mirror-symmetrical arrangement, integrally with the central plate 204 of the slider member. When the cassette 207 on lifting element 205 is lowered, the retaining lugs 211 engage through openings 212 in the lifting element. The lower retaining lugs are free to pass from above through the tape winding hubs in cassette 207 on the suspension element 206. A double front plate 213 is provided at the outer end of the central plate 204 of the slider member. Stops 214 prevent the cassettes from slipping.

The embodiments described are devices for storing magnetic tape cassettes. The following two embodiments are used for accommodating records or video discs, and especially for storing standardized, so-called "compact discs." Because these discs are very thin in relation to their diameter, the space in the interior of the housing is best utilized when the discs are closely packed together when in the housing. The discs are presented for convenient removal when the discs are out of the housing.

Figures 10A, 10B:
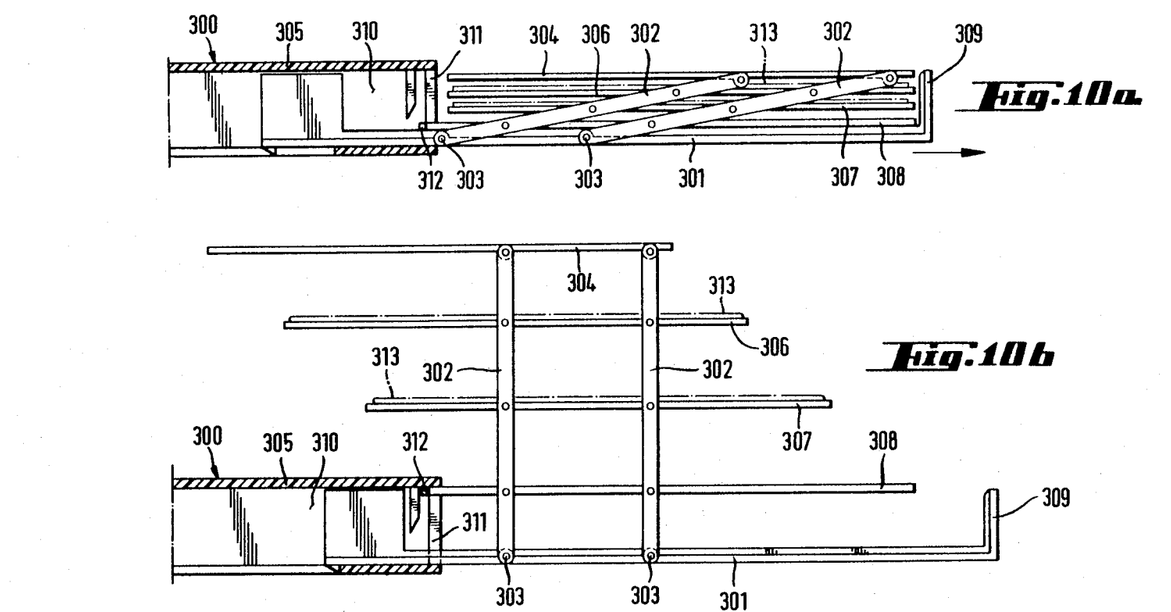
FIG. 10 shows a further embodiment, shown in an almost opened state (FIG. 10a) and in a completely opened state (FIG. 10b)
Figure 11:
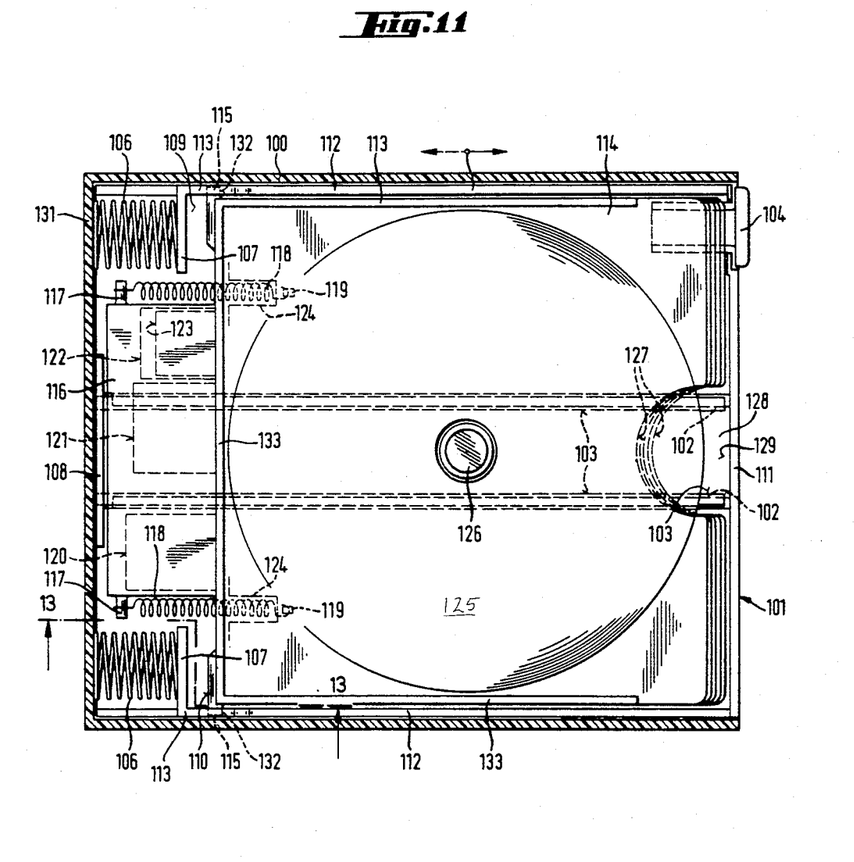
FIG. 11 shows a cut-away plan view of a device of this invention for the storage of compact discs.
Figure 12:
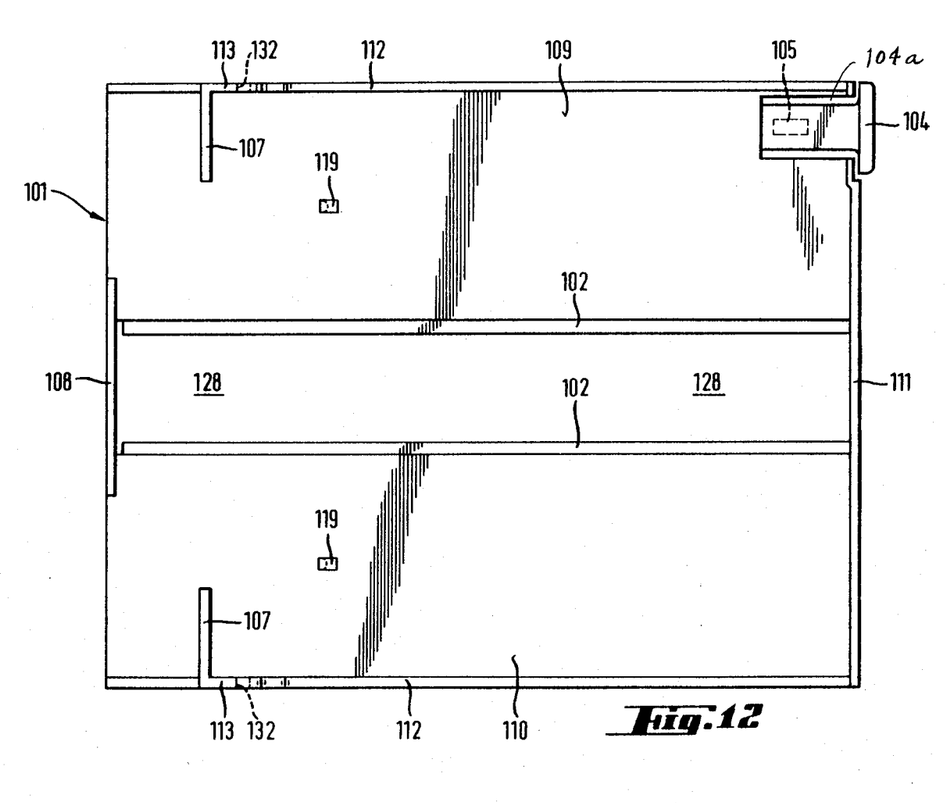
FIG. 12 shows a plan view of the associated slider member.
Figure 13:
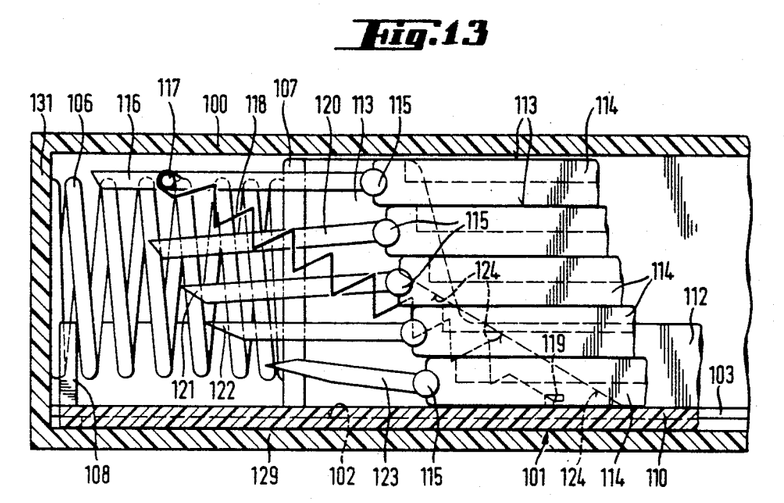
FIG. 13 shows a sectional view of part of the arrangement of receiving platters in the storage position.

The embodiment shown in FIGS. 10a and 10b comprises a slider member 301, which can be pushed out of and into a housing 300. On each side of front plate 309 of the slider is hinged a pair of guide bars 302. Guide bars 302 are pivotable about axes 303 and extend parallel to the front plate 309 of the slider member when the slider member is withdrawn from the housing member. The relationship of the distance between the pairs of axes 303 to the length of the guide bars 302 is such that when the slider member is withdrawn from the housing both guide bars are free to pivot upwardly. However, in the storage position, the guide bars are pivoted inwardly so that an uppermost disc-holder 304 will still fit underneath top wall 305 of the housing. The free ends of the quide bars are hinged to uppermost disc-holder 304 at the same axial spacing the other ends of the guide bars are spaced on the slider member. The other disc-holders 306, 307, and 308 are hinged to guide bars 302 through axes. Although the spacing between the axes is constant, the distance between the pivot axes and the front plate 309 of the slider member increases from right to left in FIG. 10a.

In the open position the lowermost disc-holder 308 extends into the housing 300. Actuator extensions 312 of disc-holder 308 project laterally from the disc-holder, close to the open front of the housing. Extensions 312 engage behind guide ribs 311, which project inwardly from side walls 310 of the housing. As soon as the actuator extensions 312 contact the guide ribs 311 when the slide is ejected, the actuator extensions 312 slide upwardly along the guide ribs 311.

The parallelogram arrangement is formed by the guide bars and the disc-holders hinged thereon in the unfolded position according to FIG. 10b. In the unfolded position, the individual disc-holders are sufficiently spaced apart for the compact discs 313 lying on them to be accessible from above and pushed forward with the fingers. If desired, the disc-holders can be provided with a cut-out portion at the front for access to the discs. In addition, the holders are stepped backwards to further facilitate access to the discs.

Figure 14:
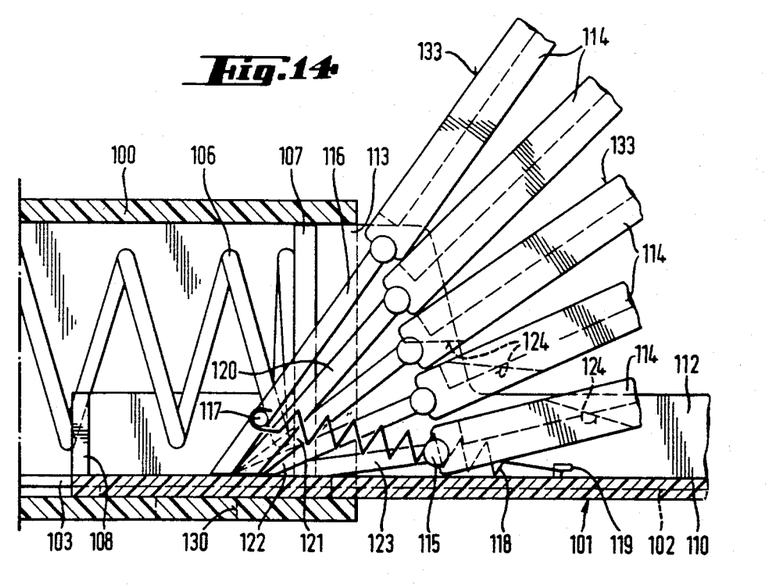
FIG. 14 shows, analogously to FIG. 13, the removal position.
Figure 15:
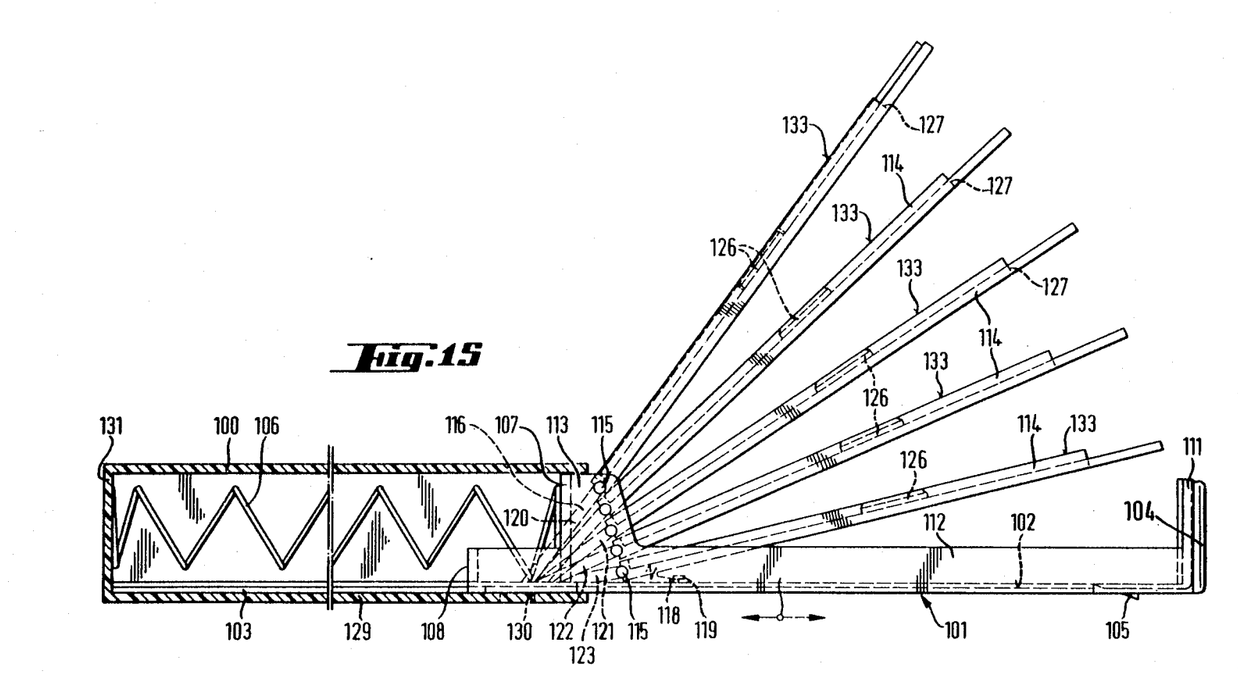
FIG. 15 shows a side sectional view of the device when open.

In FIGS. 11-15 a slider member 101 is slidably movable in the housing 100. For this purpose, the slider member comprises two base plates 109 and 110, which are connected to one another at the front of the slider member by a front plate 111 and at the rear by a rear plate 108. A step 102 projects from both base plates into the empty space 128 between these plates. Two guide rails 103 project inwardly from the housing base 129 and engage over these steps. The base plates 109 and 110 are reinforced by upright side edges 112. These edges, near the inner end of the slider member, become cheeks 113, which are joined to lugs 107. The lugs extend at right-angles to the cheeks. The height of cheeks 113 and the lugs 107 is substantially the height of the interior of the housing, as shown in FIG. 15. Helical pressure springs 106 are supported at one end against rear wall 131 of the housing and at the other end against the lugs 107. Springs 106 force the slider member out of the housing. In its insertion position, the slider member 101 is secured by a catch 105, which locks into a recess 130 in the housing base 129. The catch 105 is integrally formed with a spring button 104 and can be released by raising button 104 with the finger. Because the slider member is made of resiliently deformable plastic material, the spring button 104 can be readily separated from the material of the base plate 109 by means of the slits 104a shown in FIG. 12. The extent to which the slider member can be ejected is limited by stops which cooperate with counter stops in the housing (not shown).

Bearing pins 11 of receiving platters 114 for respective compact discs 125 are accommodated in bearing apertures 132 in the cheeks 113. A total of five receiving platters are arranged one above the other The individual receiving platters 114 differ from one another in the shape and position of their lever arms 116, 120, 121, 122, and 123. The lever arm 116 of the uppermost receiving platter 114 extends substantially over the width of the slider member between the springs 106. At the end of lever arm 116 are two pegs or hooks 117 which project laterally. Onto each hook 117 is hooked a tension spring 118. The other ends of the tension springs 118 are anchored in lugs 119, which project upwardly from the base plates 109 and 110 of the slider member. Accordingly, if the slider member 101 is unlocked and ejected from the housing 100 by the springs 106, a torque produced by the biasing of the springs 118 acts on the lever arm 116 and the uppermost receiving platter 114 is swung into the position shown in FIG. 15.

During this swinging movement, the other receiving platters are spread out as a result of the lever arm 116 of the uppermost platter acting on the lever arms 120, 121, and 122, arranged next to one another in a staggered configuration. Lever arms 120, 121, and 122 are activated by lever arm 116. Because the lever arms are of different lengths, their angle of spread is correspondingly smaller than that of the uppermost platter 114. For the lowest receiving platter, the lever ratios for operation by the lever arm 116 are unfavorable. Therefore, the lever arm 123 is activated, not by the lever arm 116, but by the lever arm 122 arranged above it (FIG. 14). The three lowest receiving platters have cut-out portion 124 so that there is room for the tension springs 118.

The records are held securely in position by means of central hub projections 126. The records can be raised by gripping them in the area of the front cut-out portions 127 of the receiving platters. A supporting rim 133 of the receiving platters defines their distance from one another in the storage position.

Variations and modifications will be apparent to one skilled in the art, and the claims are intended to cover all variations and modifications that fall within the true spirit and scope of the invention.

I claim:
1. A storage device for flat recording media comprising:
   (a) a housing having a bottom wall, a top wall, two elongate side walls, a rear wall, and an open front side;
   (b) a slider member for receiving at least one recording medium, the slider member being movably mounted in the housing and having a base portion and a front wall;

(c) means for biasing the slider member to an open position out of the housing;
(d) means for locking the slider member to a closed position within the housing against the bias of the biasing means; and
(e) lifting means for supporting and engaging underneath the recording medium, said lifting means when the device is in the open position raising the recording medium to a lifted position away from the base portion of the slider member and above the front wall of the slider member so that the recording medium is accessible for removal and insertion.

2. A device according to claim 1 wherein the lifting means supports a plurality of recording media.

3. A device according to claim 1 wherein the lifting means comprises at least one spring to bias the recording medium towards the lifted position.

4. A device according to claim 3 wherein the spring is a leaf spring.

5. A device according to claim 3 wherein the spring is a wire spring.

6. A device according to claim 5 wherein the spring is a torsion coil spring having two wire ends, one wire end being supported by the base portion of the slider member and the other wire end being supported by the recording medium.

7. A device according to claim 3 wherein the lifting means further comprises a platter-like component located between the spring of the lifting means and the recording medium.

8. A device according to claim 7 wherein stop means is provided on the platter-like component for supporting the recording medium lying on the platter-like component in the lifted position.

9. A device according to claim 1 wherein the lifting means comprises at least one platter element that is hingedly attached the slider member by a parallelogram means.

10. A device according to claim 1 wherein the housing can accommodate a plurality of compact discs packed closely together in a stack one above the other, each of the compact discs having its own lifting means.

11. A device according to claim 10 wherein each disc is supported by a platter-like holder.

12. A device according to claim 1 wherein the biasing means comprises a pressure spring element attached at one end to the slider member at a point remote from the front wall of the slider member and at the other end to the rear wall of the housing.

13. A device according to claim 12 wherein the pressure spring elements are supported against buckling.

14. A device according to claim 12 wherein the pressure spring elements also actuate the lifting means when the device is in the open position.

15. A device according to claim 1 wherein the housing has a substantially rectangular shape and a plurality of recording media can be accommodated therein, the principal planes of the recording media lying parallel to the largest surfaces of the housing when the device is in the closed position.

16. A device according to claim 11 wherein each platter-like holder is pivotably connected to the slider member and is pivotable about an axis extending parallel to the front wall of the slider member.

17. A device according to claim 1 wherein the lifting means engages the recording medium at a point that lies between the edge of the recording medium and the center of gravity of the recording medium.

18. A device according to claim 17 wherein the lifting means extends from the end of the slider member inside the housing to a point just behind the front wall of the slider member.

* * * * *